United States Patent
Spriegel et al.

[19]

[11] Patent Number: 6,105,617
[45] Date of Patent: Aug. 22, 2000

[54] FLUID STORAGE AND TREATMENT APPARATUS

[75] Inventors: Andrew R. Spriegel; Fenton M. Fitzpatrick; James E. Przepyszny, all of Erie, Pa.

[73] Assignee: General Elelectric Company, Schenectady, N.Y.

[21] Appl. No.: 09/408,067

[22] Filed: Sep. 29, 1999

[51] Int. Cl.⁷ .................................................... F16K 15/14
[52] U.S. Cl. ........................... 137/843; 137/278; 137/571
[58] Field of Search ................................ 137/268, 205.5, 137/564.5, 571, 843, 852, 855; 422/283, 261, 264, 266

[56] References Cited

U.S. PATENT DOCUMENTS 3,313,240  4/1967  Bentov ................................. 137/268 X
3,401,116  9/1968  Stanwood ............................ 137/268 X Primary Examiner—Kevin Lee
Attorney, Agent, or Firm—Carl A. Rowold, Esq.; Holland & Knight, LLP

[57] ABSTRACT

An apparatus for the storage and chemical treatment of a fluid incorporating a container in fluid communication with a tank through a check valve. A solid material is retained within container while being dissolved in fluid. A mesh prevents the migration of solid material into the check valve or tank. Check valve prevents the release of fluid from the tank in the event that cap is opened under pressurized conditions.

16 Claims, 1 Drawing Sheet

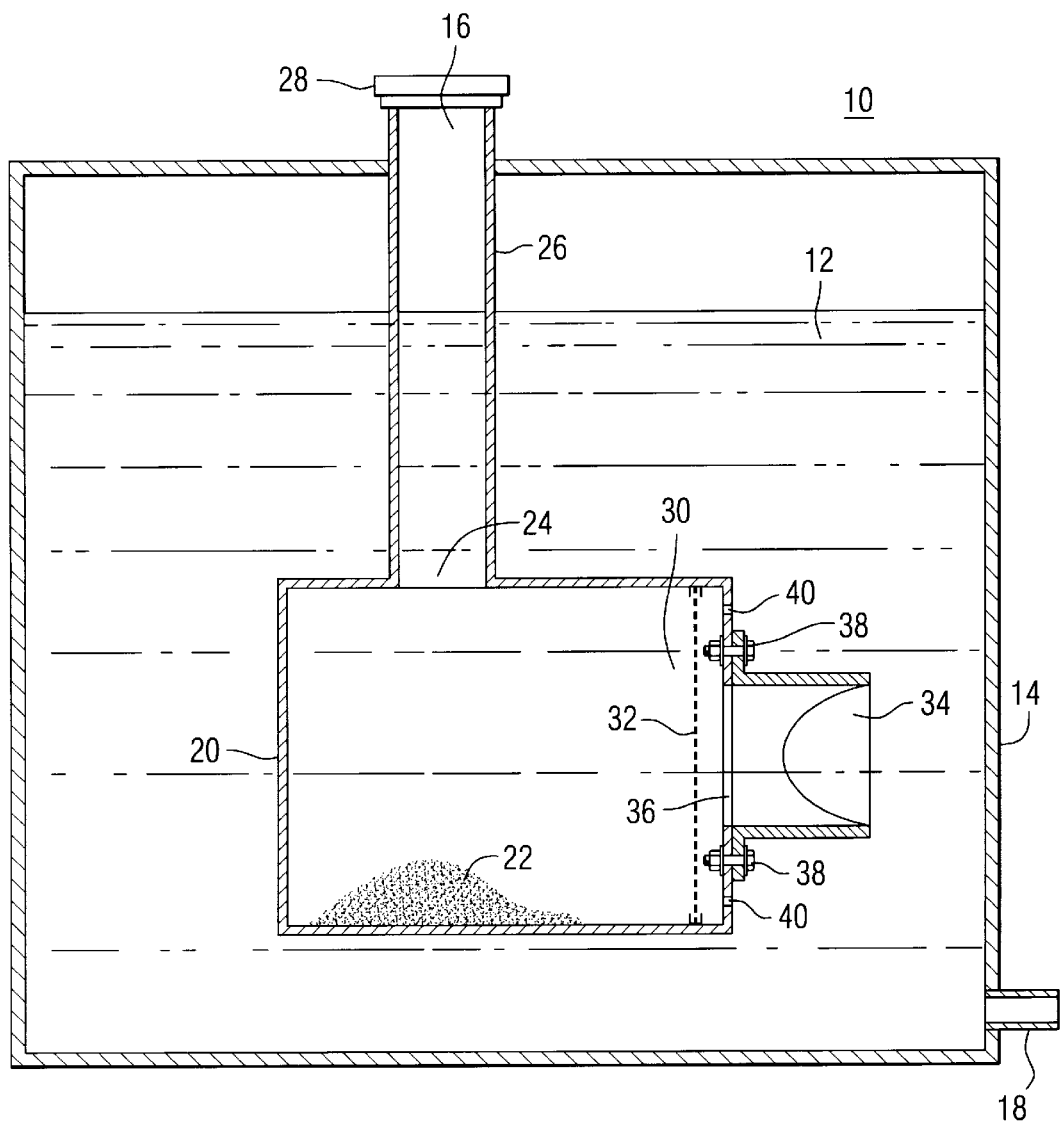

FLUID STORAGE AND TREATMENT APPARATUS

BACKGROUND OF THE INVENTION

The present invention relates generally to the field of fluid storage tanks, and more particularly to the field of water storage tanks for use in the cooling system of a motorized vehicle or a stationary power plant.

Self-propelled vehicles such as automobiles and locomotive are known to incorporate a cooling system for the engine of the vehicle. Such cooling systems may contain a water storage tank formed as part of a radiator or as a separate tank in fluid communication with a radiator. In order to increase the temperature at which the water may be maintained without boiling, the water storage tank may be maintained at a pressure that is higher than the ambient atmospheric pressure. Such water storage tanks typically include an inlet opening which is sealed during operation by a pressure cap. A danger exists if an operator removes the pressure cap while the cooling system is pressurized. For railroad locomotive applications, it is known to incorporate a bypass line and relief valve in the fill tube of such a water tank to relieve pressure prior to opening the fill cap. It is further known to incorporate a mechanism that requires the relief valve to be placed in its open position prior to the removal of the pressure cap. However, there is no mechanism to prevent the pressure cap from being removed before all of the pressure in the tank is relieved. Furthermore, in some applications a radiator or other cooling system component may be located above the height of the cap, so if there is water in the radiator when the cap is removed, gravity alone may force a backflow through the fill tube.

It is also common practice to introduce corrosion inhibiting chemicals into the cooling system of a self-propelled vehicle. For automobile applications, such chemicals are often incorporated into the cooling fluid in a liquid form. For locomotive applications, it is known to introduce such chemicals in a solid form into the water storage tank. For example, granular alkaline salt may be added to maintain the cooling water pH at the desired high level. The granular material slowly dissolves into the cooling fluid, thus providing a desired level of water treatment over an period of time. Make-up fluid and chemical additives must be periodically added to the cooling system, thereby necessitating periodic removal of the pressure cap of the tank.

BRIEF SUMMARY OF THE INVENTION

There is a need for an apparatus that will improve the safety of an operator when opening the pressure cap of a water storage tank of a cooling system, and for eliminating back flow through the fill tube caused by drainage of components located above the fill cap. Such an apparatus should facilitate the addition of both fluid and solid matter into the tank. Accordingly, a fluid storage and treatment apparatus is provided comprising a tank; a container having an inlet and an outlet, the outlet being in fluid communication with the tank; a mesh disposed in a fluid communication path between the container and the tank; and a check valve disposed in the fluid communication path between the mesh and the tank.

BRIEF DESCRIPTION OF THE DRAWING

The features and advantages of the present invention will become apparent from the following detailed description of the invention when read with the accompanying drawing in which a tank is illustrated as enclosing a container for retaining solid water treatment chemicals, the container having a check valve at its outlet, and a mesh disposed between the check valve and the container.

DETAILED DESCRIPTION OF THE INVENTION

The Figure illustrates an apparatus 10 that is useful for the storage and chemical treatment of a fluid 12. Such an apparatus 10 may be incorporated into the cooling system of the engine of a self-propelled vehicle such as a locomotive. The invention may be used in combination with other mechanisms designed to ensure the safety of the operator, such as the relief valve currently installed on certain locomotive applications. The apparatus 10 includes a tank 14 defining an interior volume for containing fluid 12. Tank 14 may include an inlet 16 and an outlet 18. A container 20 is provided for the retention of a solid material 22 utilized for the chemical treatment of fluid 12. Fluid 12 may be water and the solid material may be an alkaline salt in granular form, as is known in the art for the cooling system of a diesel locomotive engine. The container 20 is illustrated as having a generally rectangular cross section, although it may take any shape conducive to the containment and dissolution of solid material 22. Container 20 has an inlet 24 which is illustrated as being in fluid communication with tank inlet 16 by means of filler tube 26. Filler tube 26 is sealingly attached to tank 14 at inlet opening 16 and may be further sealed by a pressure cap 28. Solid material 22 may be introduced into container 20 through opening 16 and fill tube 26.

Container 20 has an outlet end 30 that is in fluid communication with the interior volume of tank 14. A mesh 32 is disposed over the outlet 30 of container 20 in order to prevent the movement of solid material 22 through the outlet 30 into the tank 14. In one embodiment, mesh 32 is formed of a stainless steel screen having a U-channel frame welded to the walls of container 20. Alternative means for filtering may be substituted for mesh 32; for example, a filter, a perforated plate, a porous solid material, or other structures known in the art for allowing the passage of fluid 12 while preventing the passage of solid material 22. The dimensions of the openings in mesh 32 are selected to be appropriate for the retention of the particular solid material 22 to be contained within container 20.

A check valve 34 is disposed in the fluid communication path between the outlet 30 of container 20 and tank 14. Check valve 34 is illustrated as being attached to the structure of the container 20 proximate its outlet 30. The check valve 34 is oriented to permit the flow of fluid 12 from the interior of the container 20 through the outlet 30 into the interior of tank 14. The check valve 34 will prevent the flow of fluid 12 from the interior of tank 14 into the container 20. In one embodiment the check valve 34 may be sealingly attached by fasteners 38 to an opening 36 formed in a wall of container 20. Check valve 34 may be an elastomeric check valve, such as those provided by Red Valve Company, Inc., Carnegie, Pa., under the trademarks "Series 35" and "Tideflex". Check valve 34 may be replaced by any means for preventing flow from the tank 14 into the container 20, for example, a float valve, a clapper valve, or a fast acting automated system capable of detecting such flow and operating to restrict the opening 30 into the container 20.

It may be appreciated that the presence of solid material 22 in the interior of check valve 34 may interfere with the proper operation of the check valve 34. Mesh 32 functions to retain the solid material 22 within container 20, thereby preventing solid material 22 from entering check valve 34. The size of the openings in mesh 32 is also selected to prevent the passage of solid material 22 of a size that will interfere with the proper operation of valve 34. In the embodiment illustrated in the Figure, container 20 is disposed within the interior of tank 14. Because there will be a small amount of leakage through check valve 34 during static conditions when the pressure is equalized between the tank 14 and container 20, the level of the fluid 12 in the fill tube 26 will approximate the level of the fluid 12 in the tank 14. Furthermore, as solid material 22 dissolves within fluid 12, the dissolved solid material 22 will migrate throughout the fluid 12 in both the container 20 and the tank 14, thereby providing the desired chemical properties throughout the entire fluid system associated with the tank 14. In order to promote additional migration of fluid 12 into and out of the container 20 during static conditions, one or more weep hole 40 may be formed in the container 20 for fluid communication between the container 20 and the tank 14. Weep hole 40 is preferably located on the tank side of mesh 32 in order to eliminate the possibility of the movement of solid material 22 into tank 14 through the weep hole 40. It is also possible to locate container 20 exterior to tank 14. For such an embodiment, the outlet 30 of container 20 will be in a fluid communication with the 16 of tank 14. The design of such an exterior container 20 will preferably be such that a sufficient amount of fluid 12 is retained within container 20 for dissolving solid material 22. The dissolved material may then be flushed into the tank 14 when additional fluid 12 is added through the opening 24 of the container 20.

It may be appreciated that the check valve 34 will prevent the rapid flow of fluid 12 from the interior of tank 14 through opening 16 when cap 28 is removed when the tank 14 is pressurized. An elastomeric check valve 34 will allow some flow of fluid through opening 30 during static conditions, but will provide a tight seal against the flow of fluid through opening 30 when a large pressure drop exists between the interior of the tank 14 and the ambient atmosphere beyond opening 16. If a weep hole 40 is used, its size is selected so that the rate of flow through the weep hole 40 around check valve 34 is small. In one embodiment, no weep hole 40 is necessary, since adequate leakage is provided through check valve 34 during static conditions.

It may be appreciated that the volume of container 20 is selected to be sufficiently large to contain an adequate amount of solid material 22, but is preferably minimized so as to reduce the amount of fluid 12 that may flash and be expelled through opening 16 when cap 28 is removed during pressurized conditions. If cap 28 is loosened when the fluid 12 is pressurized, the pressure within fill tube 26 will be relieved to the atmosphere. Additionally, some or all of the fluid 12 contained within the fill tube 26 and container 20 may flash and be expelled through opening 16. Once the pressure in container 20 is reduced by the expulsion of this limited amount of fluid through opening 16, a pressure differential will exist across check valve 34, and the expulsion of additional fluid 12 will be prevented by the closing action of check valve 34. The volume of fluid 12 within fill tube 26 and container 20 may preferably be quickly vented through the bypass valve (not illustrated) existing in many locomotive engine applications.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A fluid storage and treatment apparatus comprising:
   a tank;
   a container having an inlet and an outlet, the outlet being in fluid communication with the tank;
   a mesh disposed in a fluid communication path between the container and the tank; and
   an elastomeric check valve disposed in the fluid communication path between the mesh and the tank.

2. The apparatus of claim 1, wherein the container and the outlet are disposed within the tank and the container inlet extends to the exterior of the tank.

3. The apparatus of claim 1, wherein the outlet of the container comprises an opening formed in a wall of the container; and
   wherein the mesh is sealingly attached to the container covering the opening.

4. The apparatus of claim 3, wherein the elastomeric check valve comprises an elastomeric check valve sealingly attached to the wall proximate the opening and opposed the mesh.

5. A fluid storage and treatment apparatus comprising:
   a tank;
   a container having an inlet and an outlet, the outlet being in fluid communication with the tank;
   a mesh disposed in a fluid communication path between the container and the tank; and
   a check valve disposed in the fluid communication path between the mesh and the tank, further comprising a cap sealing engaged with the container inlet.

6. A fluid storage and treatment apparatus comprising:
   a tank;
   a container having an inlet and an outlet, the outlet being in fluid communication with the tank;
   a mesh disposed in a fluid communication path between the container and the tank; and
   a check valve disposed in the fluid communication path between the mesh and the tank, further comprising a weep hole formed in the container in fluid communication with the tank.

7. The apparatus of claim 6, wherein the weep hole is located in the fluid communication path between the mesh and the check valve.

8. In a tank having a fill tube, the improvement comprising:
   a container disposed in the tank and having an opening attached to the fill tube and having an outlet; and
   a check valve attached to the outlet in fluid communication between the container and the tank.

9. The tank of claim 8, further comprising:
   a mesh attached between the container outlet and the check valve.

10. The tank of claim 8, wherein the check valve comprises an elastomeric check valve.

11. A fluid storage and treatment apparatus comprising:
    a tank;
    a container having an inlet and an outlet, the outlet being in fluid communication with the tank;
    a means for filtering disposed in a fluid flow path between the tank and the container; and
    an elastomeric check valve for preventing fluid flow from the tank into the container through the opening.

12. The apparatus of claim 11, wherein the means for filtering comprises a mesh.

13. A fluid storage apparatus comprising:

a tank having a fill tube;

a container having an inlet in fluid communication with the fill tube and an outlet; and a means for preventing fluid flow from the tank to the container through the container outlet.

14. The apparatus of claim 13, wherein the means for preventing fluid flow comprises an elastomeric check valve.

15. The apparatus of claim 14, further comprising a means for filtering disposed in a fluid flow path between the container and the elastomertic check valve.

16. The apparatus of claim 13, further comprising a weep hole formed in the container for allowing fluid communication between the container and the tank.

* * * * *